United States Patent [19]

Ng

[11] Patent Number: 5,812,122

[45] Date of Patent: Sep. 22, 1998

[54] TESTING LAYOUT SERVICES FOR SUPPORTING COMPLEX TEXT LANGUAGES

[75] Inventor: Nelson Hon Ng, Fremont, Calif.

[73] Assignee: Sun Microsystems, Inc., Palo Alto, Calif.

[21] Appl. No.: 572,687

[22] Filed: Dec. 14, 1995

[51] Int. Cl.⁶ .................................................. G06F 3/14
[52] U.S. Cl. ........................................ 345/326; 345/334
[58] Field of Search .................................. 395/333, 758, 395/798, 339, 340, 342, 348, 352, 354, 335, 334; 704/8; 707/536; 345/326, 333, 334, 335, 339, 340, 342, 348, 352, 354

[56] References Cited

U.S. PATENT DOCUMENTS

| 5,297,250 | 3/1994 | Leroy et al. | 395/333 |
| 5,438,659 | 8/1995 | Notess et al. | 395/335 |
| 5,600,778 | 2/1997 | Swanson et al. | 395/333 |

OTHER PUBLICATIONS

Article by X/Open in conjunction with Uniform, entitled "Snapshot: Portable Layout Service: Context–dependent and Directional Text" published by *X–Open Company Ltd.*, 1994 pp. 1–82.

*Primary Examiner*—Matthew M. Kim
*Assistant Examiner*—Crescelle N. dela Torre
*Attorney, Agent, or Firm*—Graham & James LLP

[57] ABSTRACT

A test system for testing layout services for supporting complex text languages in a graphical user interface (GUI) system. A GUI application is used to test the implementation of locale-specific layout services modules via the Layout Services interface, with little or no modification of the GUI toolkit. The application allows users to modify input and output text layout attributes. The input processing layout is processed and input characters are transformed into presentation layout, and the output data may be analyzed to determine if the correct transformations are being made. The application tool allows users to test a specific locale interface, and returns the result data so that the user may interpret the data. Errors may be detected and isolated to each locale-specific language module.

19 Claims, 13 Drawing Sheets

FIG. 1
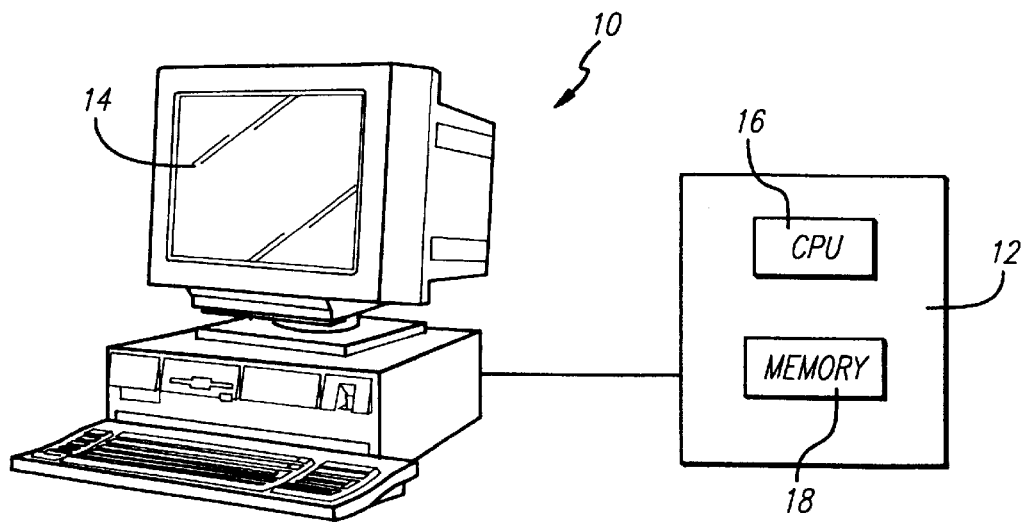
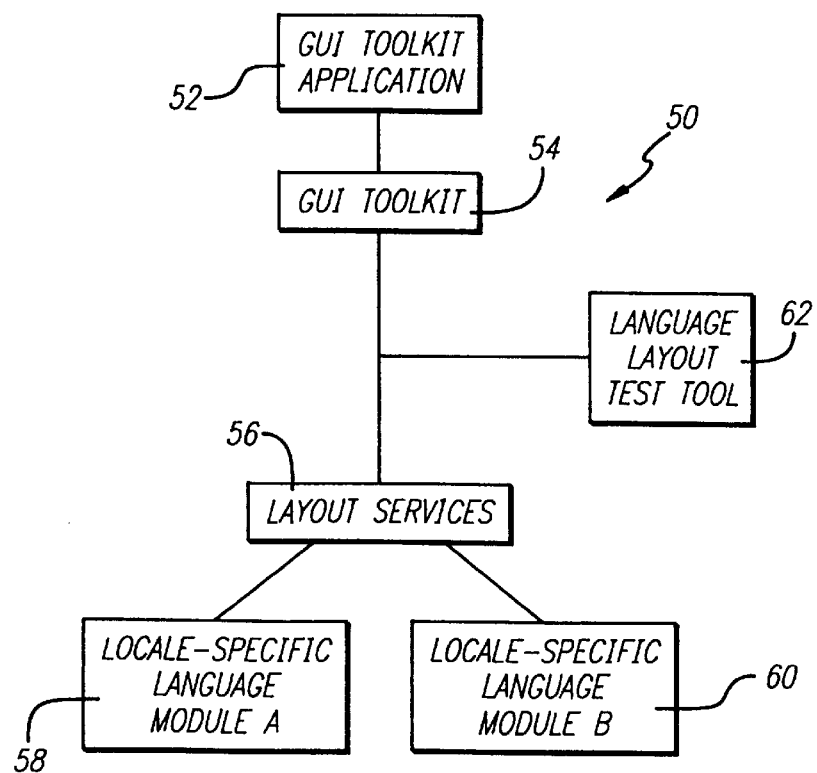
FIG. 2

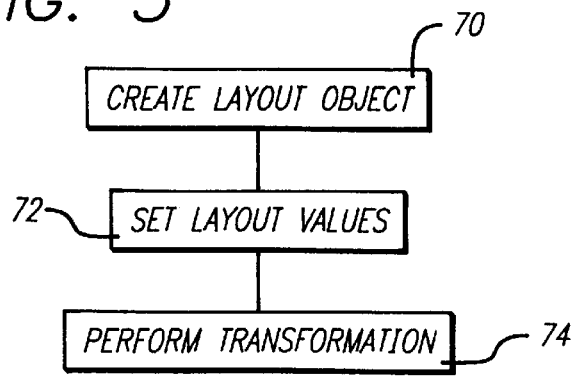
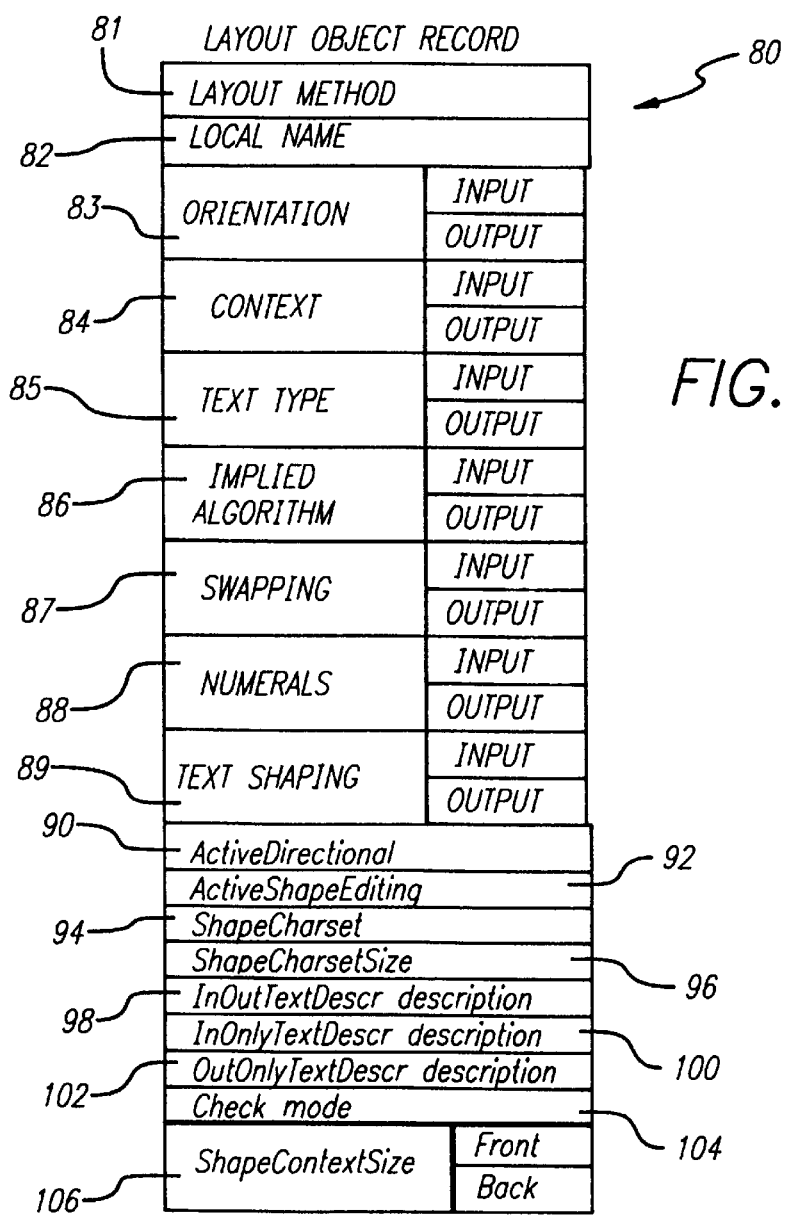

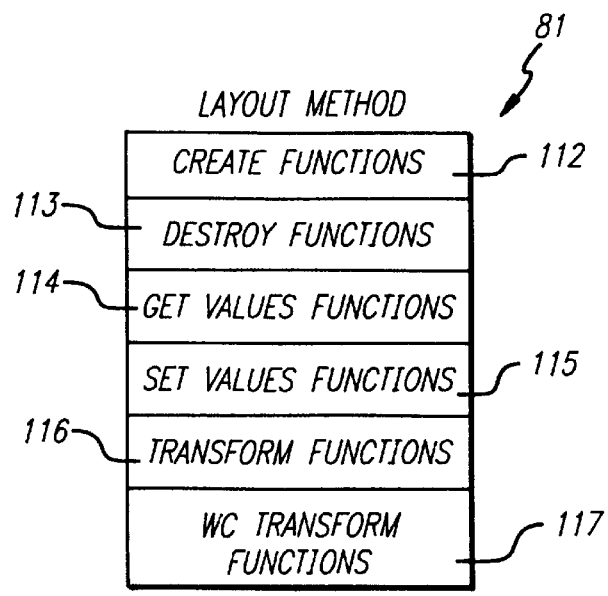
FIG. 5
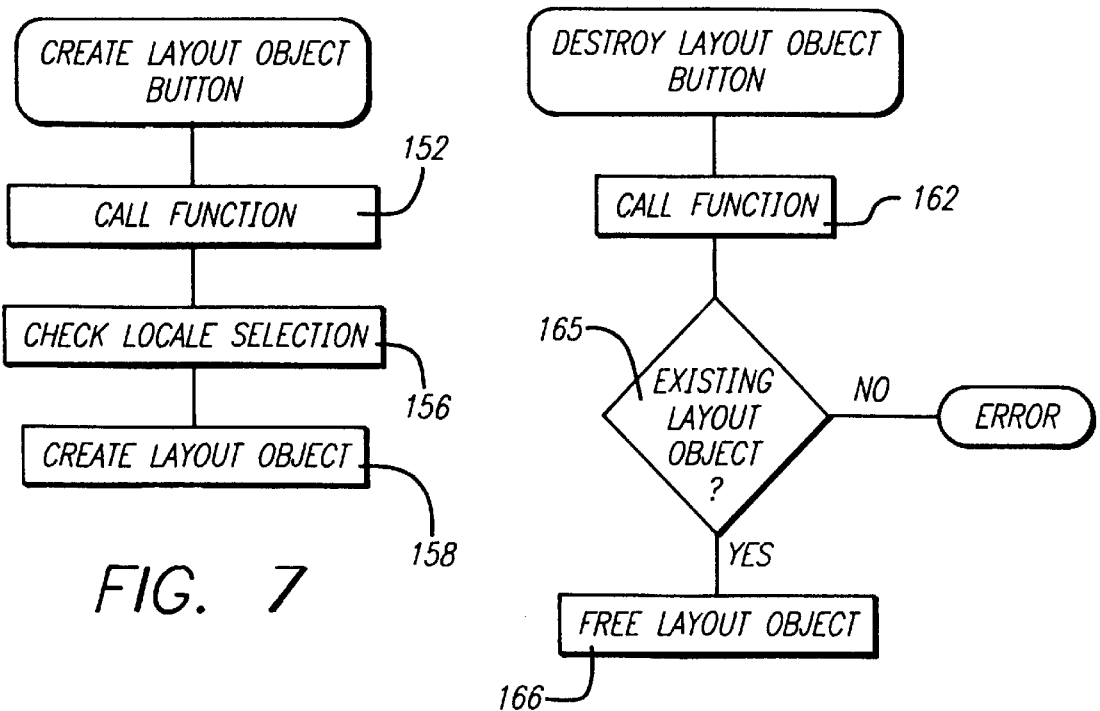
FIG. 7
FIG. 8

TESTING LAYOUT SERVICES FOR SUPPORTING COMPLEX TEXT LANGUAGES

BACKGROUND OF THE INVENTION

This application relates to a method and apparatus for software testing and, more particularly, to a method and approach for testing system support for locale-specific complex text language modules.

Over the history of civilization, thousands of languages and hundreds of scripts have been developed as a vehicle for verbal and written communication. Today about twenty-nine scripts are still commonly used. Each script has similarities as well as differences. Latin scripts (such as French, German, Italian, Swedish, Spanish) and Asian ideographic scripts (such as Chinese Hanji, Japanese Kanji and Korean Hanja) look dramatically different, but share similar characteristics when being displayed by a computer. Both can be displayed in a single writing direction, for example, so that no special processing is needed prior to rendering each character.

Other language scripts, however, require a new processing approach. Arabic language text, for example, uses a cursive right-to-left script with characters which can be rendered in different shapes depending on their placement. In the Thai script, multiple characters may appear in a single display cell.

Complex Test Languages (CTL) refers to languages whose scripts have one or more of the following characteristics:

context sensitive—characters can assume different shapes depending on neighboring characters and their placement within a word.

composite—characters are composed of a few basic elements.

bidirectional—characters are written from right-to-left horizontally, with the exception of numbers (which are left-to-right) or when intermixing with other left-to-right scripts.

In most computer systems, CTL text strings are stored in different order and form than the displayed text due to text processing efficiency. Text strings of these languages need to be preprocessed prior to being displayed.

"Character shaping" is the process of displaying the appropriate form of a character in context sensitive scripts. "Character composition" is the process of displaying a composite character by combining a few basic elements. For example, Arabic script has 28 letters written from right to left. Some characters may be displayed in different shapes depending on the placement of the character within a word.

Numbers in Arabic script are context sensitive. They can be written using both Arabic digits (as in Latin script), and Hindi digits. In an Arabic system, it is common that digits are stored in the encoding of Arabic digits. Depending on the usage, the software could convert to Hindi digits during rendering. Usually Arabic digits are used for data processing applications, while Hindi digits are used for word processing applications.

"Bidirectionality" occurs when a left-to-right script is intermixed with a right-to-left script. For example, when Arabic and Latin script are intermixed, issues which must be addressed include directional segments, global orientation, text-types, and symmetrical swapping. In addition, there are two types of ordering associated with bidirectional text processing. "Logical order" is the order which the text is input by the users and processed by applications. "Physical order" is the order in which the text is rendered on the screen.

A "directional segment" is a portion of a sentence with a different directionality than the rest of the sentence. This determines the directional flow of the text when a sentence contains script of mixed directions. A segment of right-to-left direction could be embedded or "nested" within an additional segment of left-to-right direction. In theory, there could be many levels of nesting, but only two levels are needed in most cases.

"Global orientation" describes the predominant direction of the text, and is used to determine directional flow of the sentence. "Text-types" defines the format of the text to be stored, whether it be visual text type stored in physical order, or implicit or explicit text-type stored in logical order. "Symmetrical swapping" is the transformation of text segments that include characters which imply directional meaning. For example, in Arabic the logical order of a>b in storage should be transformed into b<a when it is rendered. Other characters that require symmetrical swapping are parentheses, square brackets, braces, etc.

A more complete overview of complex-text languages may be found in *X/Open Snapshot "Portable Layout Services: Context-dependent and Directional Text"*, X/Open Document Number: S425, published by X/Open Company Ltd., UK.

In graphical user interface (GUI) toolkit architectures, language or "locale" specific layout services may be needed to support the display of CTL text strings. Such services should provide a combination of features such as shaping and character composition, numbers, and bidirectionality.

SUMMARY OF THE INVENTION

The services described above may be analyzed for correct operation by the Test Tool of the present invention. In the present invention, a Motif based GUI application is used to test the implementation of locale-specific layout services modules via the X/Open Layout Services interface, with no modification of the GUI toolkit. The Test Tool exercises the Layout Services Module and locale-specific language modules to test the proper creation and destruction of Layout Objects and to test settings of layout attribute values for the transformation of input text to output text in each language.

The application of the present invention allows users to set up specific interface layout characteristics, and returns transformation result data so that the user may interpret the data. Errors may be detected and isolated to layout services and each locale-specific language module.

The present invention allows a user to test the Layout Services and Locale-specific language module of a particular language text without modifying the GUI toolkit or interface. Data may be returned in either numerical or graphical form.

In accordance with the purpose of the invention, as embodied and broadly described herein, the invention is a user interface system for testing locale-specific language modules in a graphical user interface system. The user interface consists of a first window for creating a layout object, a second window, initiated by the first window, for setting user-modifiable layout values for the layout object, and a third window, initiated by the first window, for controlling the transformation of input text from a first input processing layout format to a second output presentation layout format.

In further accordance with the purpose of this invention, the invention is a method for testing a locale-specific language module which interfaces with Layout Services in a GUI system. The method comprises providing a layout object created according to the Layout Services and the locale-specific language module. The layout object has user modifiable layout attribute values. The tool provides a layout value interface which a user may use to modify the user modifiable layout attribute values. A transformation interface is provided for controlling the transformation of user input from processing layout properties to presentation layout properties output data, according to the layout attribute values.

In further accordance with the purpose of this invention, as embodied and broadly described herein, the invention is a computer program product having computer readable code for analyzing locale-specific language modules. The computer program product comprises computer readable program code devices configured to effect a graphical user interface (GUI) toolkit, layout services for use by the GUI toolkit, and a locale-specific language module for use by the layout services to provide text characteristics of a locale-specific language to the GUI toolkit. The computer program product also effects a layout test tool which uses the layout services, wherein the layout test tool exercises the layout services and the locale-specific language module to transform text input by a user into presentation output data.

Objects and advantages of the invention will be set forth in part in the description which follows and in part will be obvious from the description or may be learned by practice of the invention. The objects and advantages of the invention will be realized and attained by means of the elements and combinations particularly pointed out in the appended claims.

BRIEF DESCRIPTION OF THE DRAWINGS

The accompanying drawings, which are incorporated in and constitute a part of this specification, illustrate several embodiments of the invention and, together with the description, serve to explain the principles of the invention.

FIG. 1 is a basic computer system using the present invention.

FIG. 2 is a block diagram of a system architecture using the present invention.

FIG. 3 is a flowchart showing basic steps for using the test tool of the present invention.

FIG. 4 shows the data structure of a layout object of the present invention.

FIG. 5 shows the data structure of a layout method record of the present invention.

FIGS. 7 and 8 are flowcharts showing steps in performing functions of the present invention from selecting buttons of the first window.

DETAILED DESCRIPTION OF THE PREFERRED EMBODIMENTS

Figure 6:
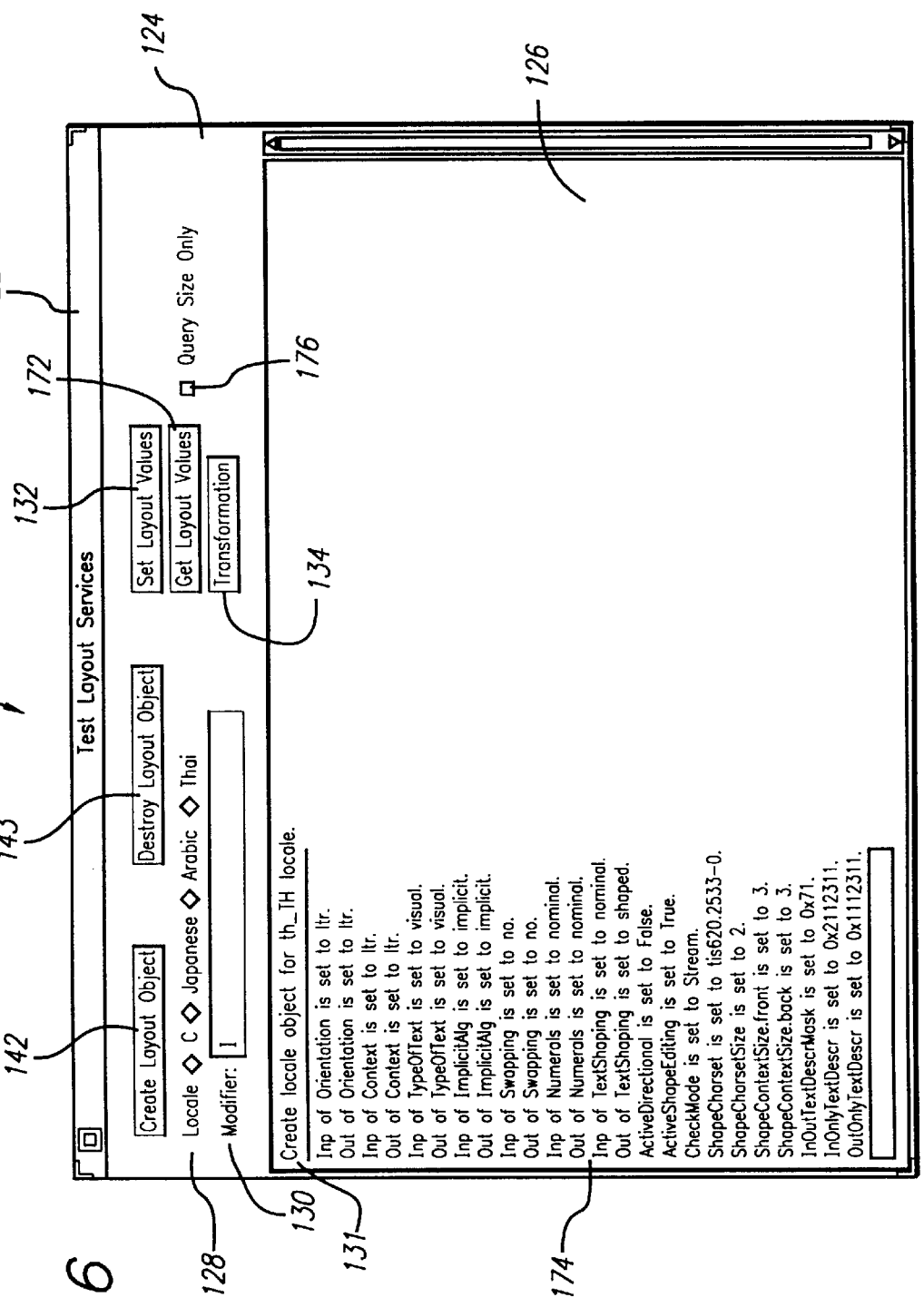
FIG. 6 shows a first window layout of an embodiment of the present invention.

Reference will now be made in detail to the preferred embodiments of the invention, examples of which are illustrated in the accompanying drawings. Wherever possible, the same reference numbers will be used throughout the drawings to refer to the same or like parts.

FIG. 1 is a basic computer system 10, employing a computing system 12 and a display 14. Computer 12 includes a central processing unit (CPU) 16 and memory 18 for storing both code and memory registers. Computer system 10 may further be connected to a network (not shown). Clearly, in a networked environment, some software for providing the features of the present invention may also be distributed in well-known ways over one or more systems of the network.

FIG. 2 shows a basic system architecture 50 that may be used for the system of the present invention. A Graphical User Interface (GUI) application 52 is based upon a GUI toolkit. The embodiment of the present invention herein discussed is based upon X/Open Motif 1.2.4, but clearly other GUI systems may be used.

GUI toolkit 54 employs Layout Services 56, which provide the layout architecture for the present system. Layout Services 56 transform a text string according to internal layout values settings. Layout Services 56 are used primarily for languages whose internal representations are different from their presentation representation. For example, a language stored in left-to-right horizontal representation may be displayed in a right-to-left representation on the screen.

Locale-specific language Modules 58 and 60 provide detailed layout information about specific language text characteristics and features. For example, the orientation and context of text of language A, Thai for example, is described for Layout Services 56 in Locale-specific Language Module 58. Each language is implemented in a separate module, and locale-specific modules are dynamically loadable during application start-up.

In the present invention. Language Layout Test Tool 62 is employed to test the accuracy of the locale-specific language modules and Layout Services. Test Tool 62 is a client of the Layout Services interface. Test Tool 62 allows the user to bypass GUI Toolkit 54 and toolkit application to examine the output of the Layout Services 56 and locale-specific language modules 58 and 60, and to isolate errors from the GUI toolkit without modifying the application 52 or toolkit 54.

The embodiment of the present invention herein discussed is based upon X/Open Motif 1.2.4. The application allows users to test a specific interface, and returns the result data so that the user may interpret the data. Errors may be detected and isolated to each locale-specific language module. In the present embodiment, the invention is implemented in the Common Desktop Environment (CDE) of Sun Microsystems, Inc. of Mountain View, Calif. It will be clear to one skilled in the art that many other implementations are possible.

FIG. 3 describes the basic operation of the tool of the present invention. These steps are each described in more detail in connection with FIGS. 6–19. In step 70, a layout object 80, as described in FIG. 4, is created for the particular desired locale in which to perform the transformations needed. For creating layout object 80, layout attribute values are retrieved by the Layout Services from the locale-specific language module.

In step 72, layout values for layout object 80 for the particular locale-specific language text are set by the user. This includes the orienientation, type of text, and context, among other text attributes, of both the input and output layouts.

To enter, process, and present a text in a complex-text language, it is necessary to perform a transformation between input processing layout and output presentation layout. The processing layout is the layout of text when stored or processed. The presentation layout is the layout of text when presented on a display or printer.

Once the layout object 80 is created and its layout attribute values are set, step 74 performs the transformation according to the layout attribute values and the appropriate locale-specific language module. As discussed, complex text strings may be stored in a different order and form than the displayed text, due to processing efficiency. The transformation of step 74 processes the input string and transforms the input characters into output data which may be analyzed to determine if the correct transformations are being made by the Layout Services 56 and one of Language Modules 58 or 60.

In the present invention, each of steps 70, 72, and 74 is facilitated by a separate window in the Motif environment, as will be described. Thus, the Test Tool of the present invention exercises the Layout Services 56 and locale-specific language module to check the creation and destruction of the Layout Object, the setting and review of layout values, and the results of transformations to correct data for rendering particular language texts.

FIG. 4 illustrates the structure of the Layout Object 80, created in step 70 by the Layout Services 56. Layout Object 80 includes Layout Method record 81, further described in FIG. 5. Other attributes, which will be discussed below, stored in Layout Object 80 include Local name 82, which describes the character set, Orientation 83 that describes the orientation of the language text, Context 84 that describes the contextual attributes, Text Type 85 that describes the process by which characters are rendered, Implied Algorithm 86 that describes the type of bidirectional implicit algorithm used in reordering and shaping text, Swapping 87 that describes the transformation of text segments with implied directional meaning, Numerals 88 that describes the shaping of numerals in the text, and Text shaping 89 that describes the process by which characters are rendered.

ActiveDirectional 90 is used to indicate directional text elements, and ActiveShapeEditing 92 is used to indicate of context-dependent code elements. These attributes are not modifiable by the user. ShapeCharset 94 is used for specifying the charset of the output text, and ShapeCharsetSize 96 is used to specify the encoding size of the ShapeCharset.

InOutTextDescrMask 98, InOnlyTextDescr 100, and OutOnlyTextDescrMask 102, are used as masks to tell which input and output layout values should be queried. Check mode 104 indicates checking for elements in the input buffer for shaping and reordering. ShapeContextSize 106 specifies the size of the context to be accounted for when performing active shape editing. ShapeContextSize remains unchanged for the life of the Layout Object.

These values are retrieved from the locale-specific language module for the user selected language when the layout object is created. Each of these attributes is more fully discussed in "X/Open Snapshot: Portable Layout Services . . . " previously referenced.

FIG. 5 shows the Layout Method Record 81 from FIG. 4 in more detail. Included are fields which point to the functions which Create 112 the Layout Object, Destroy 113 the Layout Object, Get Values 114 of the Layout Object, Set Values 115 of the Layout Object, Transform 116 the text and WC Transform 117 the text. The function pointers are defined in the Layout Services module 56, and Layout APIs may be found in "X/Open Snapshot: Portable Layout Services . . . " previously referenced.

FIG. 6 shows a first window Test Layout Services window 120 of an embodiment of the present invention. As seen in the figure, the tool window includes a title header 122, a button subwindow 124, and a text subwindow 126.

The Test Layout Services 120 window is the primary window of the tool of the present invention and the first window that a user uses to set up the layout properties of the test. The button subwindow includes buttons Create Layout Object 142 and Destroy Layout Object 143 that create and destroy the layout object according to functions 112 and 113 of FIG. 5.

The Locale selection 128 allows the user to indicate the desired language text to be used in the test, according to the locale-specific language modules. "C" provides a basic subset of English characters. Also shown in the present embodiment are Japanese, Arabic, and Thai locales, although clearly other locales may also be implemented. For the description herein, the Thai locale has been selected by a user.

The Modifier subwindow 130 provides an interface command line to allow the user to modify default settings of the layout object. Layout values in string form are described in Sections 4.2 and 4.3 of previously referenced "X/Open Snapshot: Portable Layout Services . . . ".

When Create Layout Object button 142 is selected, a Layout Object 80 is created by the Layout Services module, and text appears in text subwindow 126 reciting feedback on the layout object created.

FIGS. 7 and 8 each show steps performed by CPU 16 to perform functions of the present invention as a result of the user selecting buttons of the Test Layout Services window.

FIG. 7 describes the steps resulting from selecting the Create Layout Object button 142. Step 152 begins with the CPU determining the create function to call from record 112 of Layout Method Record 81, and calling the function. In step 156, the CPU checks the locale selection made previously by the user, and in step 158 creates a Layout Object 80.

FIG. 8 describes the steps resulting from selecting the Destroy Layout Object button 143 in FIG. 7. In step 162, the CPU calls the appropriate function for deleting the object. In step 165 the CPU checks for the existence of a layout object. If no layout object exists, an error occurs. The tool will print an error message in the Test Layout Services window and return. Step 166 frees Layout Object 80.

Returning to FIG. 6, when the Get Layout Values button 172 is selected text 174 shows the layout values of the Layout Object 80 in subwindow 126. When Query Size Only 176 is also selected, the text subwindow displays only the size attribute layout values, such as ShapeCharset, ShapeContext and InOutTestDescrMask, InOnlyTextDescr, and OutOnlyTextDescr.

Figure 9:
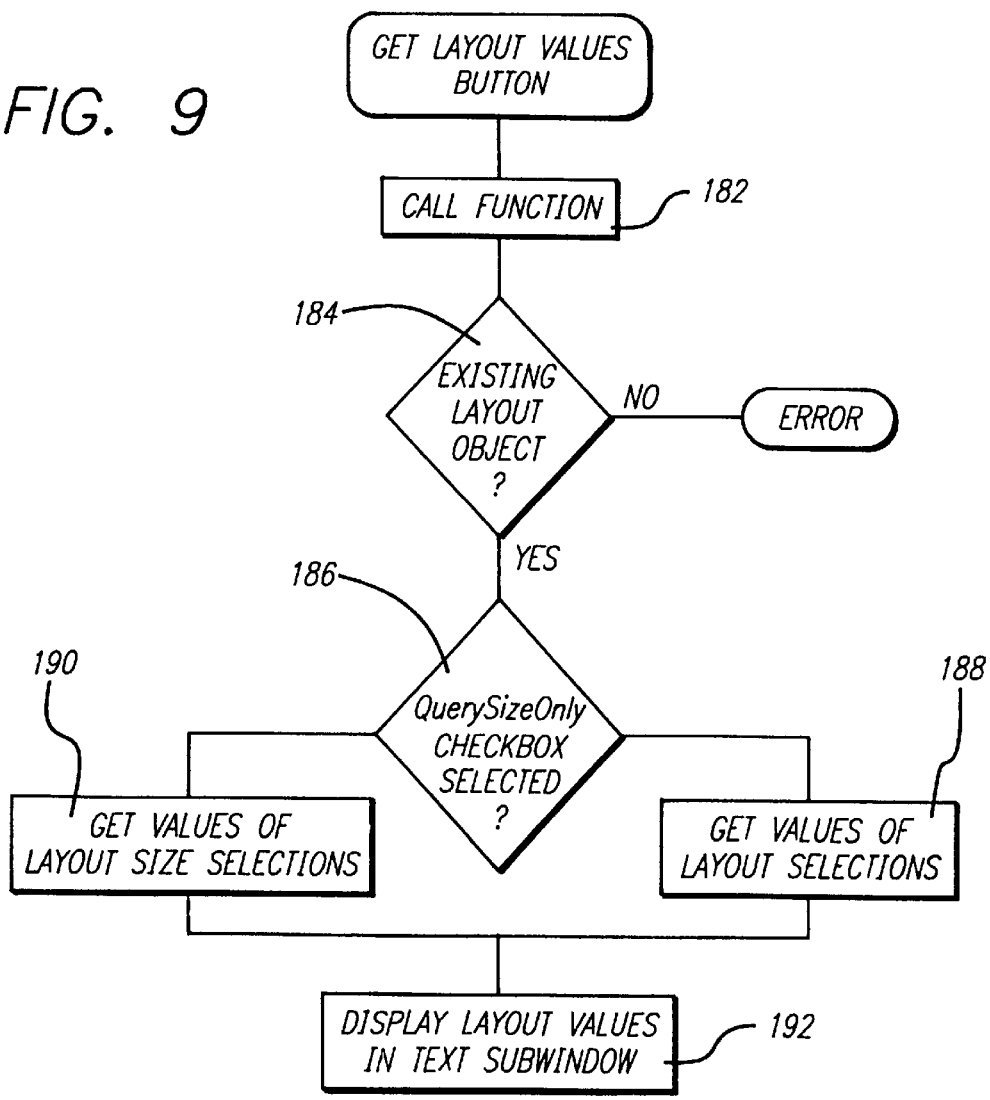
FIG. 9 is a flowchart showing steps in performing functions of the present invention from selecting buttons of the first window.

FIG. 9 shows the steps resulting from selecting the Get Layout Values button 172. Again, step 182 determines and calls the appropriate function from Layout Method record 114. In step 184 the CPU checks for the existence of a layout object. If none has been created, an error is returned, with a message displayed in the Test Layout Services window. Step 186 checks the tool settings for the selection of Query Size Only 176. If it is not selected, step 188 gets the values of the layout selections. If Query Size Only is selected, step 190 retrieves only the size attributes. The retrieved values are displayed in text subwindow 174 by step 192.

Figure 10:
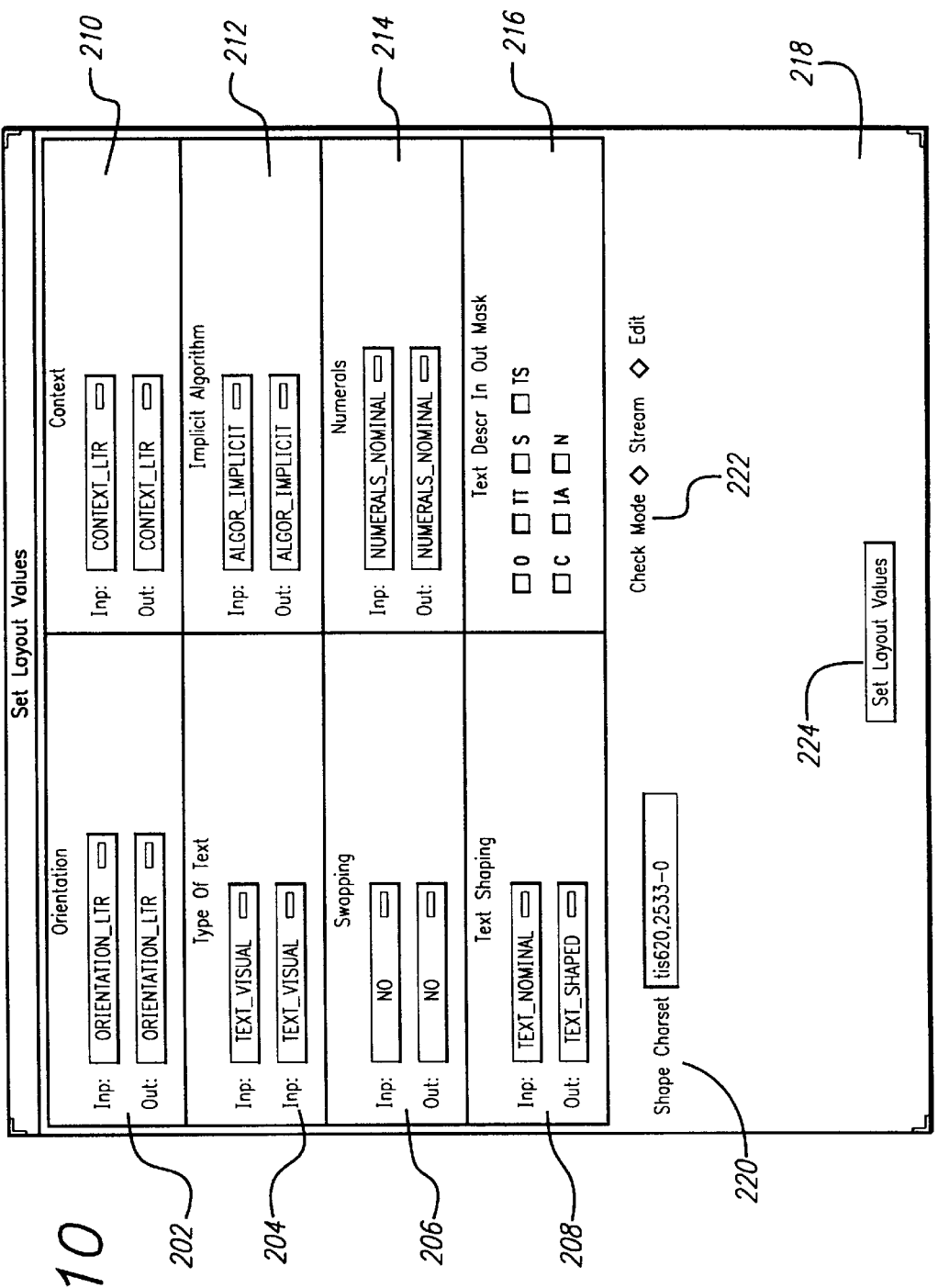
FIG. 10 shows a second window layout of an embodiment of the present invention.

The Set Layout Values window 200 in FIG. 10 appears as a result of selecting the Set Layout Values button 132 of FIG. 6. The Set Layout Values window allows the user to adjust various user-modifiable layout attribute values 83–89 as desired. Each of the options available in the Set Layout Values window are more fully described in the previously referenced "*X/Open Snapshot: Portable Layout Services.*".

The Set Layout Services window 200 includes subwindows for each of the attributes that may be set by the user, and shows the current set tings in the descriptor of each button. All buttons are initialized with the default values stored in the locale-specific language module for the particular locale. Layout values are changed by selecting the button corresponding to the layout value, to which a popup window appears showing the possible options available for that property. Furthermore, an "invalid" selection is provided so that the user may test for error conditions and determine whether the Layout Services 56 handles an incorrect input properly.

Subwindow 202 is used to set the Input and Output values for Orientation. The global orientation of text sets the predominant direction of the input and output text—left-to-right, right-to-left, top-to-bottom, etc.

Subwindow 204 set the Input and Output values for the Text-Type. The Text-type is used to define the format of the character order. For example, visual text-type represents text, such as English, in physical order. Implicit text-type—such as Arabic and Hebrew—and explicit text-type—texts with additional control characters embedded—represent text in logical order.

Subwindow 206 sets the Input and Output values for symmetrical Swapping, indicating the transformation of text segments with implied directional meaning, such as "<", ">", "(", etc.

Subwindow 208 sets the Input and Output values for Text Shaping. Shaping is the process by which characters are rendered in the appropriate presentation forms.

Subwindow 210 sets the Input and Output values for Context. Context is meaningful if the orientation is set to contextual and there are no strong characters in the text.

Subwindow 212 sets the Input and Output values for the Implicit Algorithm setting. The Implicit Algorithm descriptor specifies the type of bidirectional implicit algorithm used in reordering and shaping of directional or context-dependent text.

Subwindow 214 set the Input and Output values for Numerals. The numerals descriptor specifies the shaping of numerals in the text.

Subwindow 216 is used to set masks which inform the tool which layout values are to be used in each application. A mask is available for each of the above described attributes. For example, the "O" mask tells the tool whether or not to use the Orientation layout values.

Shape Charset input 220 allows the user to set font indexing to convert the output to an output character set. Each different font code has a different font index. If the locale-specific module supports more than one font, this is the way to specify which font to use.

Check Mode 222 has two possible values, Stream and Edit, which indicate the level of checking of the input buffer for shaping and reordering purposes. Stream indicates that the input contains valid combinations of characters of character elements and doesn't need validation. Edit indicates that the shaping of input text may vary depending on locale-specific validation or assumptions.

The descriptor of each button gives a visual feedback of the current settings of that property. However, the internal settings for each layout value in layout object 80 do not change until the Set Layout Values button 224 is selected.

Figure 11:
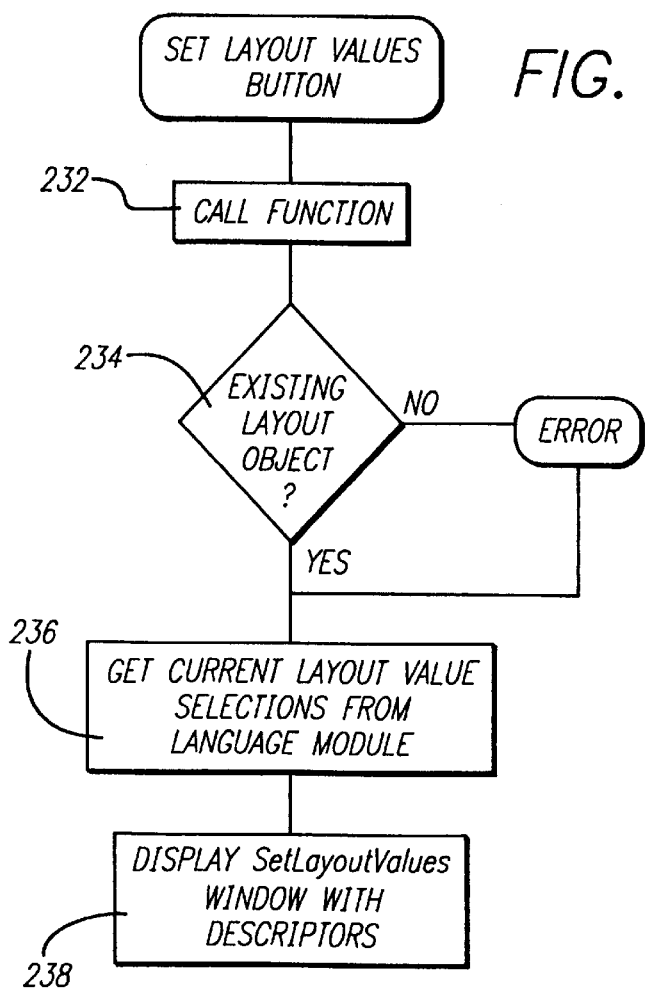
FIG. 11 is a flowchart showing steps in performing functions of the present invention from selecting buttons of the first window.

FIG. 11 shows steps resulting from selecting Set Layout Values button 132 in window 120 of FIG. 6. In step 232 the CPU determines which function to call as a result of selecting the Set Layout Values button 132 from Layout method record 115 and calls the function. Step 234 checks for a layout object. If none has been created, an error is returned, with a message displayed in the Test Layout Services window. Step 236 gets the current layout value selections from the locale-specific language module of the language selected, and step 238 displays these values in the descriptor of each button of Set Layout Values window 200.

Figure 12:
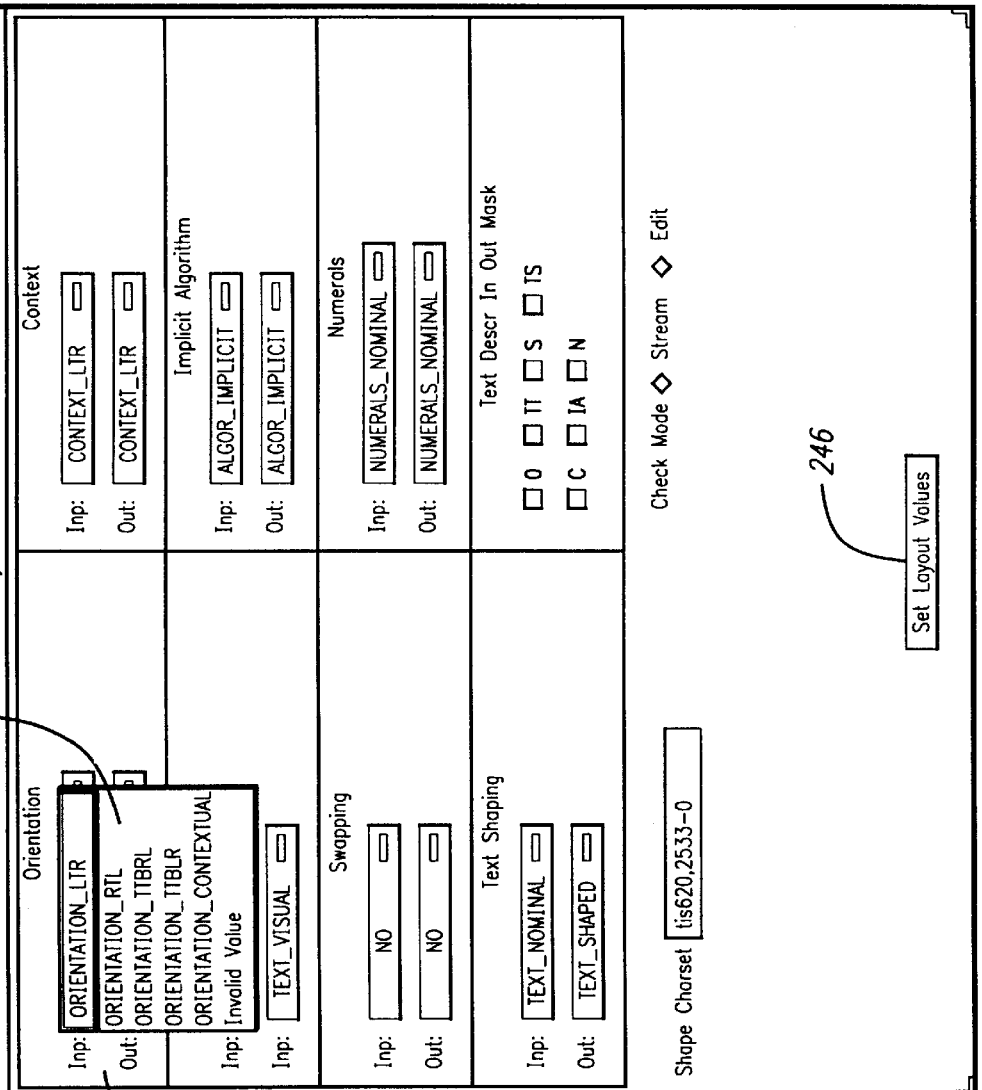
FIG. 12 shows a second window layout of an embodiment of the present invention with a pop-up menu resulting from a selection.

The Set Layout Values window 240 in FIG. 12 shows pop-up window 244 which appears as a result of selecting button 242, the Orientation input button. Each of the input and output buttons in the subwindows of the Set Layout Values window operates in a similar manner, producing a popup window with the appropriate choices for that layout value. When the layout value is changed, the new value is reflected in the descriptor shown in each button. For this description, only the Orientation input button will be described in detail. The possible choices for each layout value are detailed in "*X/Open Snapshot: Portable Layout Services . . .* " previously referenced.

The Orientation options described by popup window 242 include left-to-right (Orientation_LTR), right-to-left (Orientation_RTL), Top-to-bottom vertical columns right to left (Orientation_TTBRL) and left-to-right (Orientation_TTBLR), and context (Orientation_contextual).

Pop-up window 244 further includes an invalid selection (Invalid Value) to allow for testing for error and invalid conditions. For each layout value, Invalid value is set to a value known to be invalid for that particular layout value.

Figure 13:
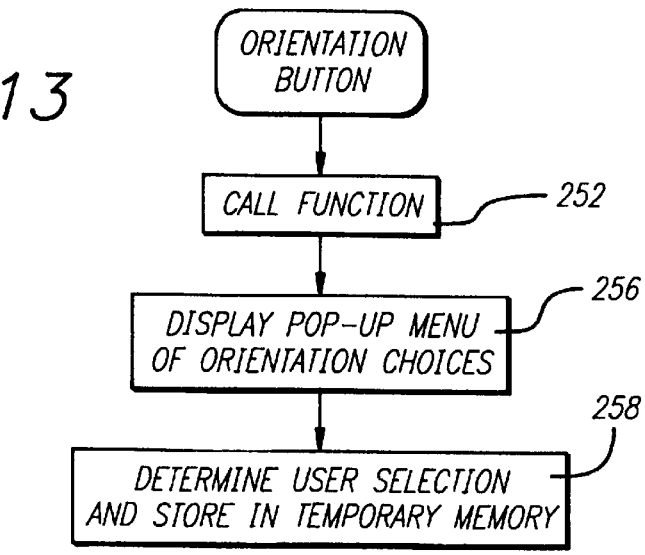
FIGS. 13 and 14 are flowcharts showing steps in performing functions of the present invention from selecting buttons of the second window.

FIG. 13 shows the steps in selecting the orientation setting function. Step 252 determines the function 115 to call as a result of selecting the orientation button and calls the appropriate function. The pop-up menu is displayed in step 256, showing the orientation options available. In step 258 the CPU determines the user's selection and stores it in temporary storage (not shown).

Figure 14:
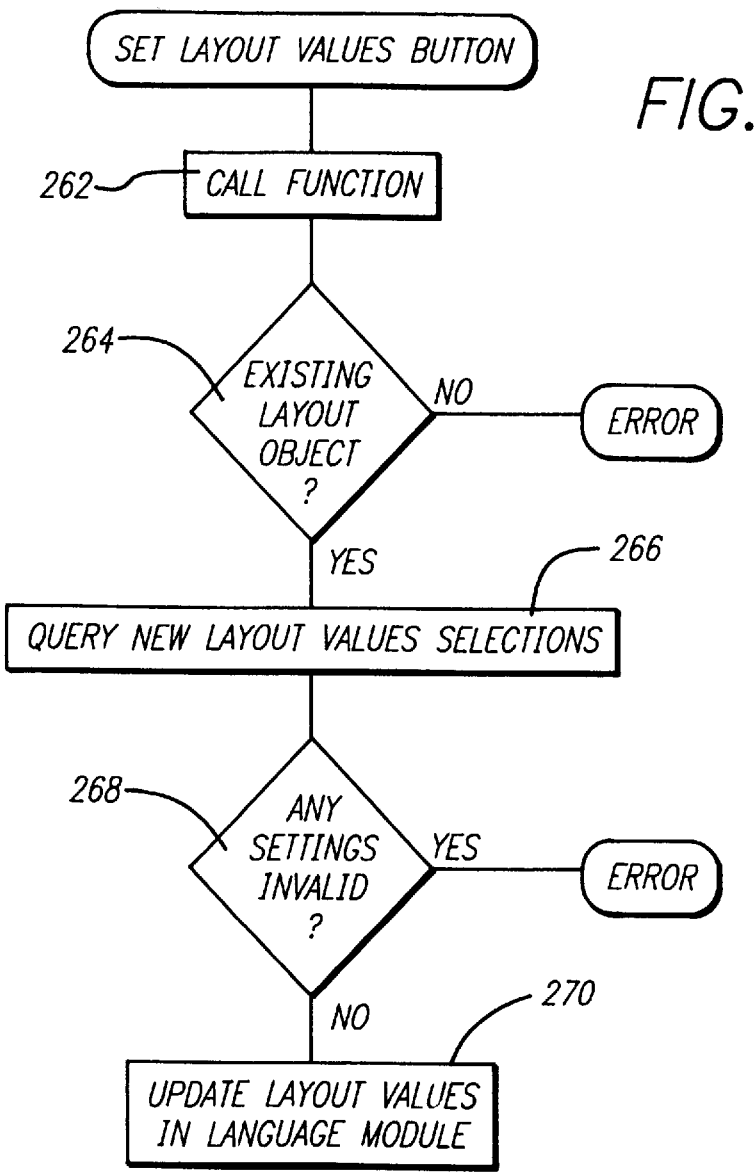

When layout values are changed by the user, the Set Layout Values button 246 in Set Layout Values window 240 must be selected to store the new layout values in the locale-specific language module 80. FIG. 14 shows the steps that are performed as a result of selecting Set Layout Values button 246. Step 262 determines which function to call as a result of selecting Set Layout Values 246 and calls the appropriate function. Step 264 checks for a layout object. If none has been created, an error is returned, with the message "Layout object is not yet created. Please create it before setting layout values" displayed in the Test Layout Services window In step 266 the CPU queries the data structure of each button for new Layout Values settings. If any of the layout values have been set to Invalid value, step 268 checks for invalid settings and, if the language module and Layout Services are correctly implemented, will return an error message to the Test Layout Services window. In step 270, the CPU updates the layout values in the locale-specific language module.

Figure 15:
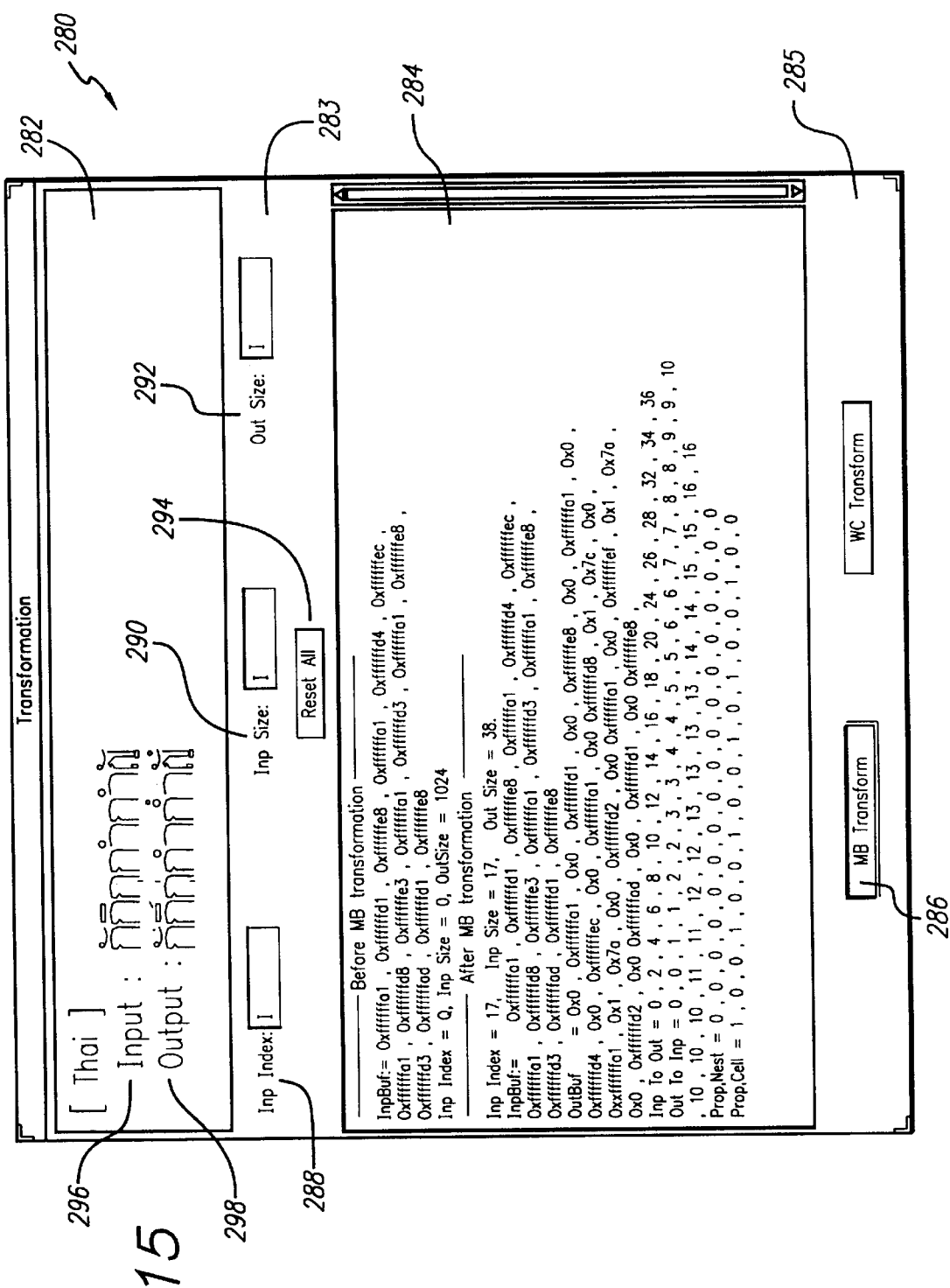
FIG. 15 shows a third window layout of an embodiment of the present invention.

When Transformation button 134 is selected, Transformation window 280 is generated, shown in FIG. 15. The window includes a text subwindow 282, a modifier subwindow 283 used to control the extent of the transformation by modifying the input index and size and output size, a text subwindow 284, and transformation buttons area 285.

When the user inputs text, using a keyboard mapped to the appropriate locale text, the text is echoed in the "Input:" area 296 in text subwindow 282. "Output:" 298 values appear only after each transformation is complete. Any further input invalidates the output, and it is erased until the next transformation is performed. Reset All button 294 resets the input and output values and indexes of the window, and prepares for a new transformation.

The tool may perform a multibyte transformation (MB Transformation) or a Wide Character Transformation (WC Transformation). The transformation algorithms are defined in the "*X Open Snapshot: Portable Layout Services . . .* " previously referenced.

MB Transformation is generally used for English characters and Asian characters of 2 or more bytes per character. WC transformations are used for fixed length alphabets, in which all the characters in the character set are a fixed length of bytes.

Input index 288 is an integer directing where in the input buffer processing should start. In some cases, a user may wish to start processing somewhere other than at the beginning of the input. When a transformation is performed, the tool processes the character strings as far as possible. If an error occurs, the tool stops processing at the point in the text where the error occurs. By using the input index, a user may skip over troublesome characters and continue processing a string, for example. Likewise, the length of the portion of the input buffer to be processed may be set using Input Size input 290 so that only selected parts of an input are displayed. The Output buffer size may also be set using the Output Size input 292. The output buffer size specifies the size of the transformation data output. If this buffer is set too small for the input buffer transformation, an error is returned to the Test Layout Services window.

When the transformation is performed, as mentioned above the transformation is performed up to a point where it encounters an error. Additional transformations may be performed after the erroneous character position by setting the Input Index.

Figure 16:
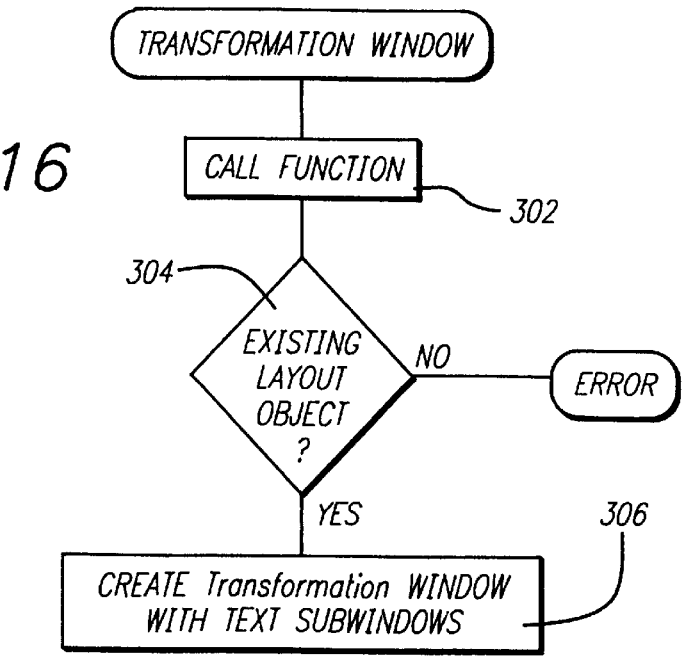
FIGS. 16 and 17 are flowcharts showing steps in performing functions of the present invention from selecting buttons of the first and third windows.

A text sample is input as shown in text subwindow 282, in the locale selected by the user in window 120 of FIG. 6. The steps shown in FIG. 16 are performed as a result of selecting the Transformation button 134 of FIG. 6 and inputting text into subwindow 282. When the MB Transformation button 286 is selected, the results of the transformation are displayed as shown in output subwindow 284. The text displayed in subwindow 284 shows the Input buffer, Input Index, Input Size, and Output Size variables before the transformation. The results after the MB Transformation show the Input Index (InpIndex), Input Size (InpSize), and Output size(Outsize) variables used for the transformation, the Input buffer (InpBuf) and Output buffer (OutBuf) values, InptoOut output which cross references from each InpBuf code element to the transformed data, OuttoInp output which cross references to each InpBuf code element from the transformed data, and PropNest and PropCell, showing the nesting and cell levels of the characters. The transformed text characters are shown as output string 298.

In step 302, the CPU calls the appropriate transformation function 116 or 117. In step 306 the CPU creates an input/output text subwindow 282, and another, output-only text subwindow 284. A status message is printed in the Test Services Layout window.

Figure 17:
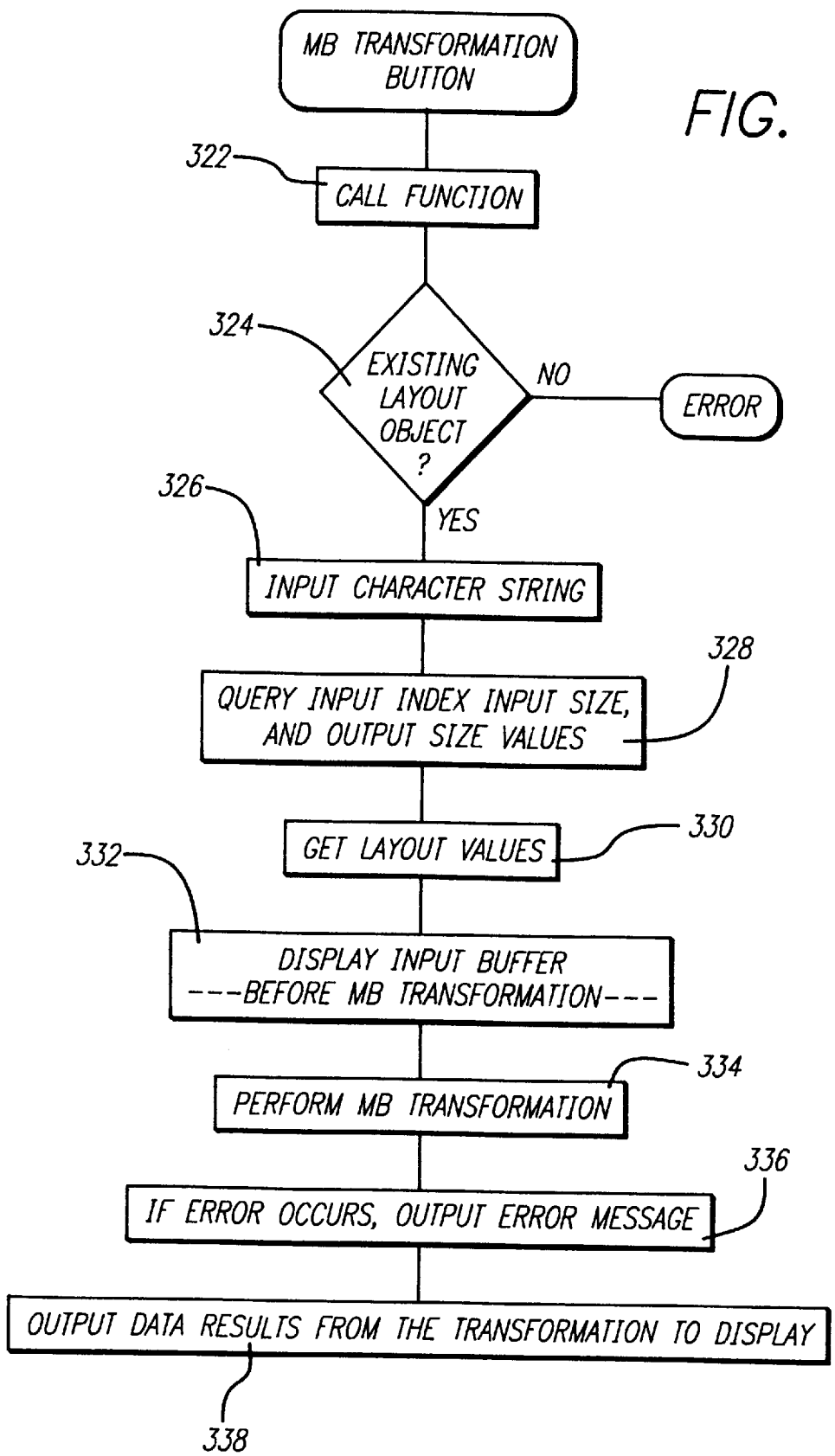

FIG. 17 shows the steps to be performed when the MB Transform button 286 of FIG. 15, a multibyte transformation, is selected in Transformation window 280. In step 322 the CPU calls the appropriate multibyte transformation function pointed to by Layout Method Record 116. Step 324 checks for a layout object. If none has been created, an error is returned, and the message "Layout object is not yet created. Please create it first." is displayed in the Transformation window text subwindow 282. In step 326, the CPU retrieves the user input string from subwindow 282, and in step 328 queries the input index, output index, and output size variables entered by the user in area 283. In step 330 the CPU retrieves the layout values from the locale-specific language module of the present language text.

In step 332, the input buffer is displayed in the output text window 284 under the heading "Before MB Transformation". In step 334 the CPU performs the MB Transformation according to information from Layout Services 56 and Layout object 80 including the user-modifiable layout values.

If an error is detected during the transformation, step 335 prints an error message. In step 336 the CPU converts the input string to presentation format for the currently set locale for output in subwindow 282.

Step 338 prints the data output resulting from the transformation. The output string from step 335 is written as "Output:" 298 in human-readable form, and window 284 displays encoding values of the string and the transformation. If an error occurred, only the text results up to the point of the error are returned. The Transformation window keeps track of the state when an error occurs, so that a user can continue when an error has occurred.

Figure 18:
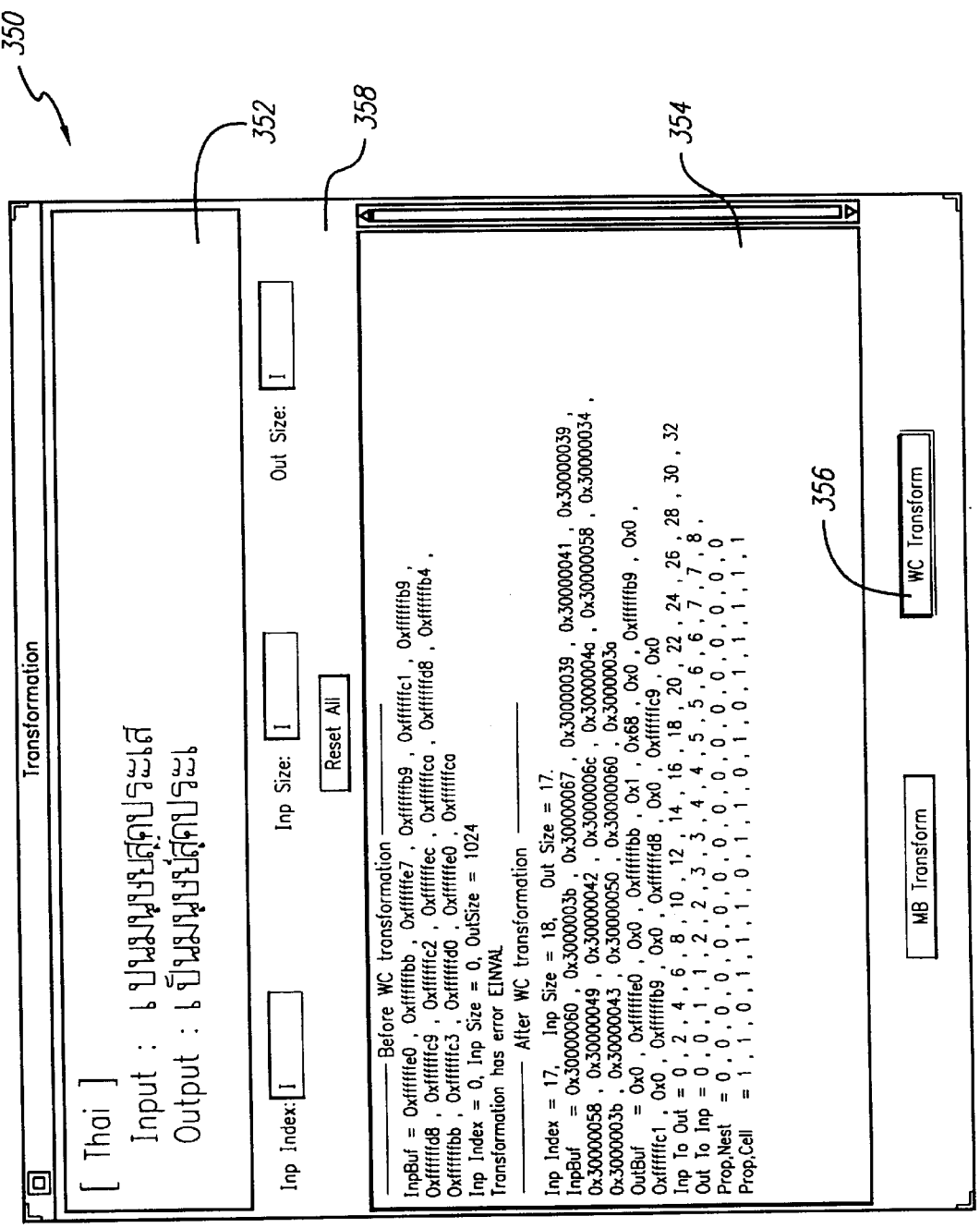
FIG. 18 shows a third window layout of an embodiment of the present invention with a second button selection.
Figure 19:
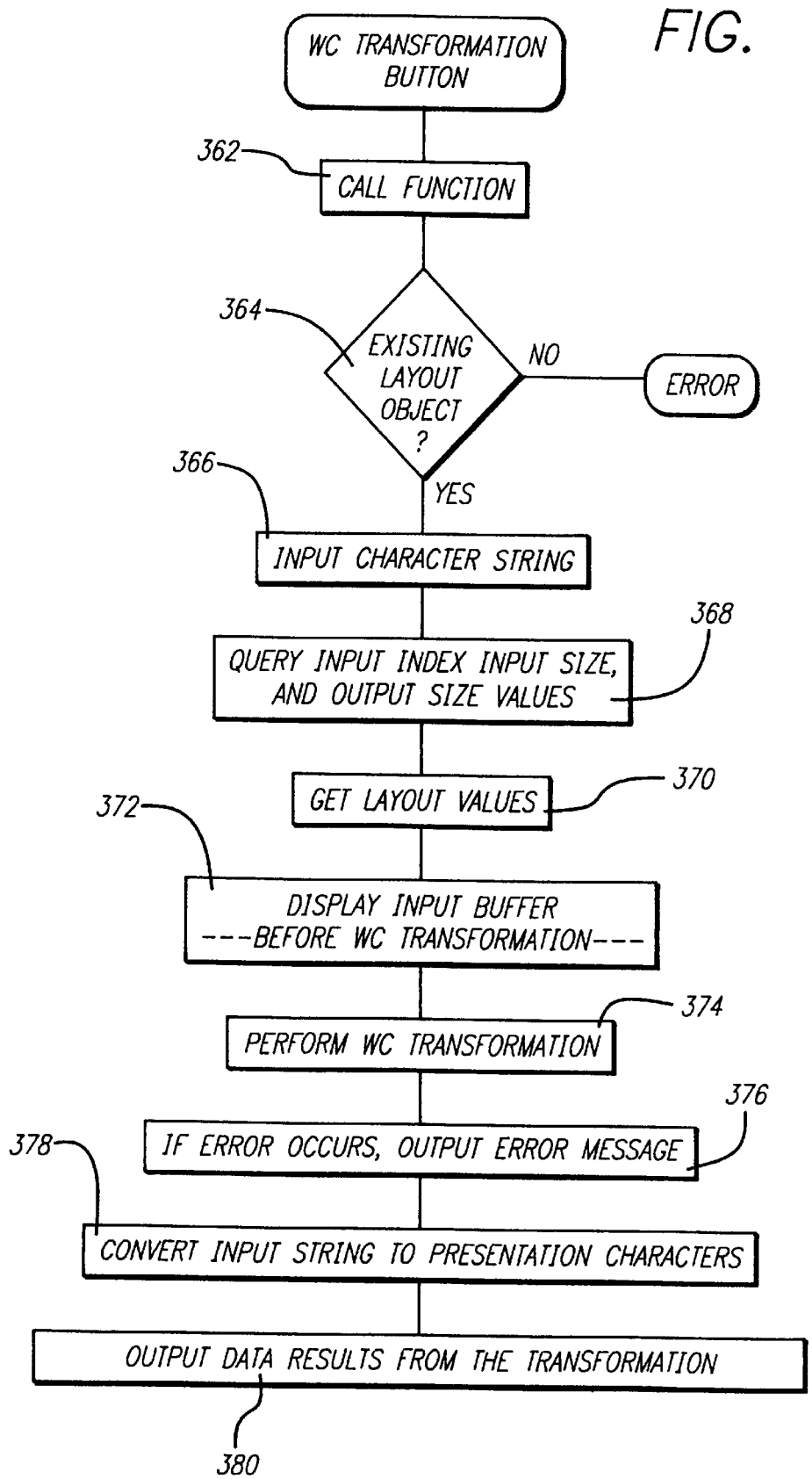
FIG. 19 is a flowchart showing steps in performing functions of the present invention from selecting a button of the third window.

FIG. 18 shows Transformation Window 350 with output subwindow 354 displaying the results of a wide character (WC) Transformation, from the selection of the WC Transformation button 356. FIG. 19 shows steps in performing the WC transformation. In step 362 the CPU calls the appropriate function, and in step 364 checks for a layout object. If none has been created, an error is returned, with the message "Layout object is not yet created. Please create it first." displayed in the Transformation window text widget 282. In step 366 the CPU inputs the character string input by the user in subwindow 352, and step 368 queries the input index, output index, and output size variables entered by the user in area 358. Step 370 retrieves the Layout Values from the locale-specific language module.

In step 372, the input buffer is displayed in the output text window 354 under the heading "Before WC Transformation". Step 374 performs the WC Transformation.

If an error is detected during the transformation, step 376 prints an error message. In step 378 the CPU converts the input string to presentation format for the currently set locale for output in subwindow 352. Step 380 prints the data output resulting from the transformation.

As described herein, the Test Tool of the present invention is used to test the Layout Services and locale-specific language modules in a GUI system for proper presentation of foreign language texts. The Test Tool works directly with the Layout Services, requiring no changes to the system GUI toolkit interface. The Test Tool is employed to check the creation and destruction of a Layout Object by the Layout Services, set and review layout values, and present the results of transformations for analysis of correct data for rendering of particular language texts. The tool allows users to set up specific interface layout characteristics, and returns transformation result data so that the user may interpret the data. The results of the transformation are returned both as transformed text strings and as numerical values for the user to analyze for errors or corrections.

Other embodiments will be apparent to those skilled in the art from consideration of the specification and practice of the invention disclosed herein. It is intended that the specification and examples be considered as exemplary only, with a true scope of the invention being indicated by the following claims.

What is claimed is:

1. In a Graphical User Interface (GUI) computer system, a method for testing a plurality of locale-specific language modules with a language layout test tool that interfaces with a graphical user interface application and a graphical user toolkit, the method providing a graphical user interface and comprising the steps of:

providing a list of names of languages in a first window, corresponding to the locale-specific language modules, the first window allowing a user to choose one of the language names;

providing a layout object created according to a Layout Services Module and at least one of said locale-specific language modules, said layout object further having user modifiable layout attribute values;

providing a graphical layout value interface for use by a user to modify said user modifiable layout attribute values; and providing a graphical transformation interface for controlling a transformation by the Layout Services Module in accordance with at least one of the locale-specific language modules of user input from processing layout properties to presentation layout properties output data according to said user modifiable layout attribute values, wherein the language layout test tool allows a user to bypass the graphical user toolkit and the graphical user interface application to examine output of the transformation of the at least one of the locale-specific language modules and allows a user to isolate errors from the graphical user interface toolkit without modifying the graphical user interface application and the graphical user toolkit.

2. The method of claim 1, further comprising presenting said output data to said user.

3. The method of claim 2, wherein said step of presenting said output data to said user further comprises presenting said presentation layout data in numerical form.

4. The method of claim 1, wherein said layout value interface further comprises a window in said GUI system which provides an interface to each of said user modifiable layout attribute values.

5. The method of claim 1, wherein said transformation interface further comprises a window in said GUI system which provides an input area for said user input and an output area for presenting said output data.

6. A computer program product having:

a computer usable medium having computer readable code embodied therein for analyzing locale-specific language modules, the computer program product comprising:

computer readable program code devices configured to a cause a computer to effect a graphical user interface (GUI) toolkit;

computer readable program code devices configured to cause a computer to effect layout services for use by said GUI toolkit;

computer readable program code devices configured to cause a computer to effect a locale-specific language module for use by said layout services to provide text characteristics of a locale-specific language to said GUI toolkit; and computer readable program code devices configured to cause a computer to effect a layout test tool which further uses said layout services according to said GUI toolkit, wherein said layout test tool provides a list of names of languages in a first window, corresponding to the locale-specific language modules, the first allowing a user to choose one of the language names, wherein said layout test tool exercises said layout services and said locale-specific language module to transform text input by a user into presentation output data.

7. The computer program product of claim 6, wherein said layout test tool comprises:

computer readable program code devices configured to cause a computer to effect creating a layout object with user modifiable layout value attributes;

computer readable program code devices configured to cause a computer to effect a layout values interface for modifying said user modifiable layout value attributes;

computer readable program code devices configured to cause a computer to effect a transformation of user input text data into presentation output data according to said layout object and said user modifiable layout value attributes.

8. The computer program product of claim 6, wherein said transformation produces presentation output in numerical form.

9. A method for testing a plurality of locale-specific language modules with a language layout test tool that interfaces with a graphical user interface application and a graphical user toolkit, the method providing a graphical user interface and comprising the steps of:

providing a list of names of languages in a first window, corresponding to at least one of the locale-specific language modules, and an interface in the first window allowing a user to choose one of the listed language names, providing a first button in the first window for allowing a user to create a layout object corresponding to the chosen language name;

providing a second window, initiated by a second button in said first window, for allowing a user to set user-modifiable layout values for input and output layout attributes of said layout object; and providing a third window, initiated by a third button in said first window, for allowing a user to control a transformation on input text from a first input processing layout format in accordance with the input layout attributes to a second output presentation layout format in accordance with the output layout attributes, wherein the language layout test tool allows a user to bypass the graphical user toolkit and the graphical user interface application to examine output of the transformation of at least one of the locale-specific language modules and allows a user to isolate errors from the graphical user interface toolkit without modifying the graphical user interface application and the graphical user toolkit.

10. The method as recited in claim 9, further comprising the step of:

providing a fourth window, initiated by a fourth button in said first window for allowing a user to destroy said layout object.

11. The method as recited in claim 9, further comprising the step of:

providing a button is said first window for allowing a user to retrieve layout attribute values of said layout object, and said first window further comprising a text subwindow for displaying the layout attribute values of said layout object.

12. The method as recited in claim 9, further comprising the step of:

providing in said second window subwindows for displaying descriptors of said user-modifiable layout values.

13. The method as recited in claim 12, further comprising the step of:

providing in said second window subwindows for displaying descriptors of values for each of said user-modifiable layout values.

14. The method as recited in claim 9, further comprising the step of:

providing in said third window a button for initiating transformations.

15. The method as recited in claim 14, further comprising the step of:

providing in said third window subwindows for allowing a user to enter parameters for controlling the extent of the transformation.

16. The method as recited in claim 19, further comprising the step of:

providing in said third window a first text subwindow for displaying input text strings and transformed output text strings, and a second text subwindow for displaying the results of the transformation.

17. A user interface system for providing a universal graphical user interface for testing a plurality of locale-specific language modules, the system comprising:

a plurality of locale-specific language modules wherein each module provides layout information of one locale-specific language;

a layout service for providing the layout structures of at least one of the locale-specific language modules by transforming a text string of the language according to internal layout value settings; and a language layout test tool for testing the accuracy of the locale-specific language modules and the layout service, wherein the language layout tool provides a list of names of languages in a first window, corresponding to the locale-specific language modules, the first window allowing a user to choose one of the language names, wherein the language layout test tool allows a user to bypass a graphical user toolkit and a graphical user interface application to examine output of a transformation of the locale-specific language modules and allows a user to isolate errors from the graphical user interface toolkit without modifying the graphical user interface application and the graphical user toolkit.

18. The user interface system as recited in claim 17, wherein the language layout test tool provides:

a first window having a first button for allowing a user to create a layout object, a second window, initiated by a second button in said first window, for allowing a user to set user-modifiable layout value for input and output layout attributes of said layout object, and a third window, initiated by a third button in said first window, for allowing a user to control a transformation on input text from a first input processing layout format in accordance with the input layout attributes to a second output presentation layout format in accordance with the output layout attributes.

19. The user interface system as recited in claim 18, wherein the language layout test tool provides a fourth button for allowing a user to destroy said layout object.

* * * * *

UNITED STATES PATENT AND TRADEMARK OFFICE
CERTIFICATE OF CORRECTION

PATENT NO. : 5,812,122

DATED : September 22, 1998

INVENTOR(S) : Nelson Hon Ng

It is certified that error appears in the above-identified patent and that said Letters Patent are hereby corrected as shown below:

The filing date should be correct to reflect -- December 13, 1995 -- instead of "Dec. 14, 1995."

Col. 13, Line 45 should read -- claim 15 -- instead of "claim 19."

Signed and Sealed this

Fourth Day of April, 2000

Q. TODD DICKINSON

*Attest:*

*Attesting Officer*   *Director of Patents and Trademarks*